…

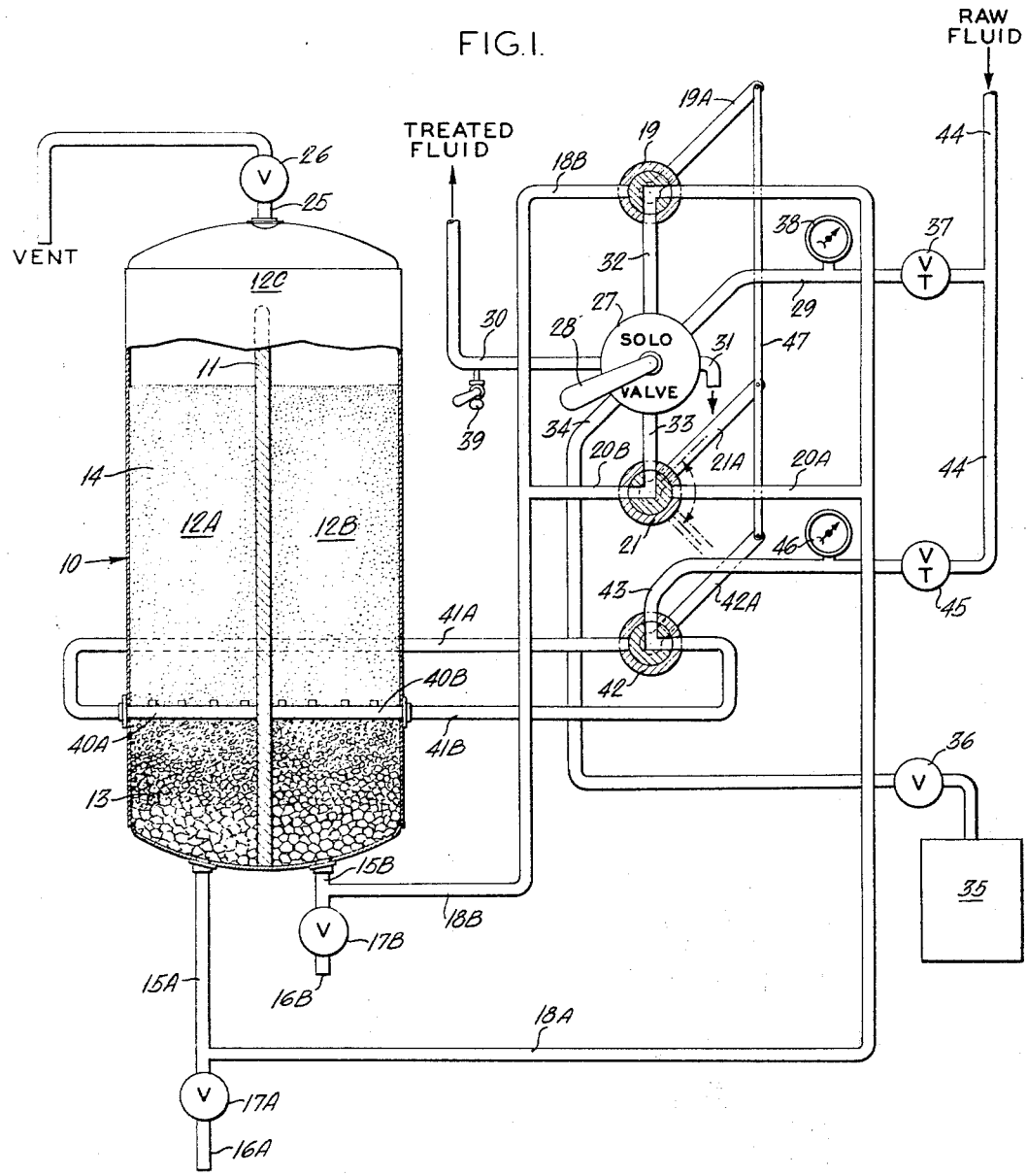

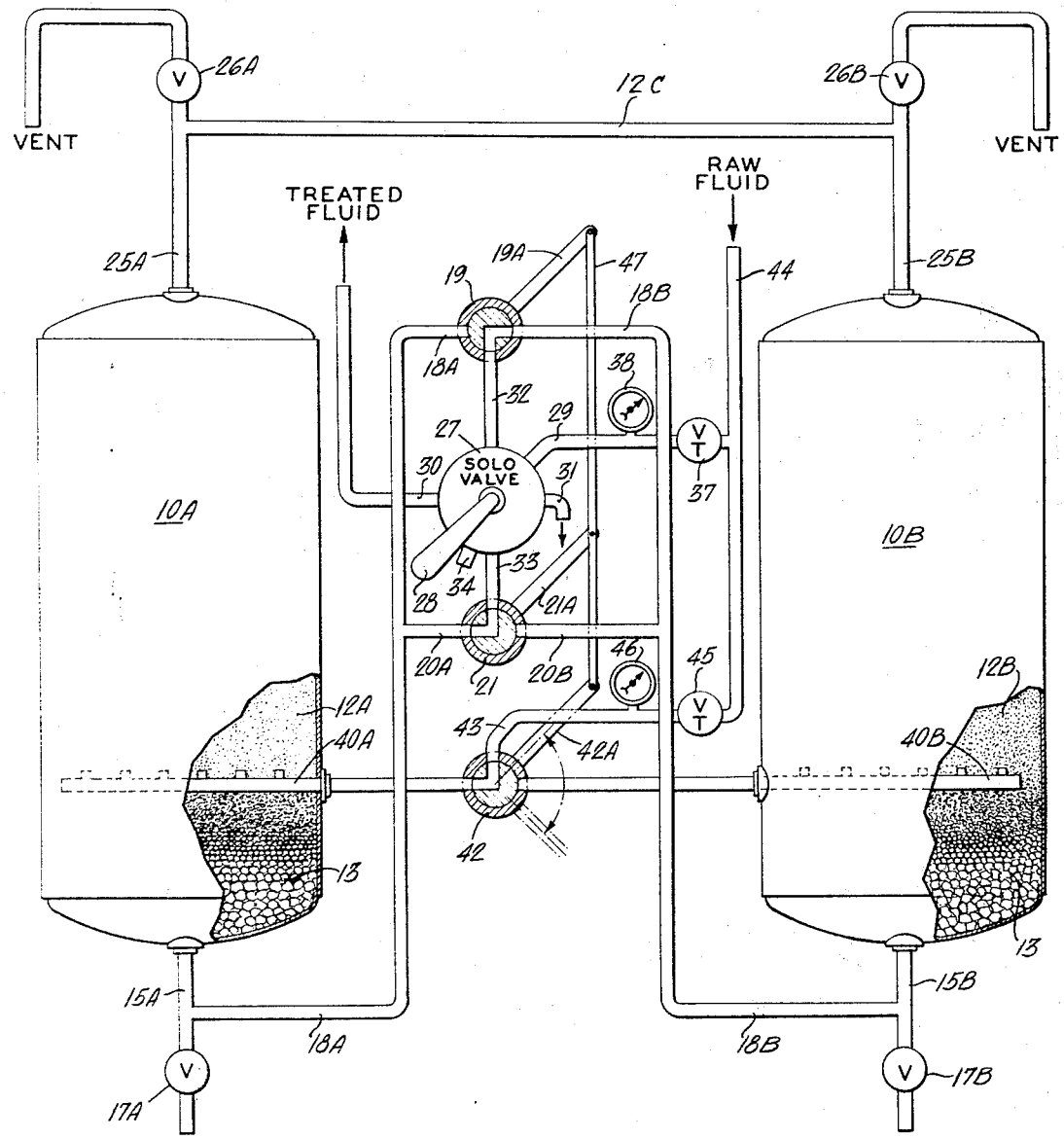

United States Patent Office 3,441,503
Patented Apr. 29, 1969

3,441,503
LIQUID TREATING APPARATUS AND METHOD
Frank J. Smith, 7352 Limekiln Pike,
Philadelphia, Pa. 19138
Continuation of application Ser. No. 450,115, Apr. 22, 1965. This application Dec. 26, 1967, Ser. No. 693,341
Int. Cl. C02b 1/76, 1/68
U.S. Cl. 210—35                    9 Claims

ABSTRACT OF THE DISCLOSURE

This application discloses liquid treating apparatus and method, especially for softening water, comprising a dual-chamber reverse-flow arrangement which provides a normal cycle of softening, back-washing and regeneration by master control means and high-velocity back-washing of the upper portion only of the beds of material under separate control means which can be operated independently of the master or main control means, the arrangement avoiding disarrangement of the lower portions of the beds of material while merely shifting the lighter upper portions of treating material between chambers without any substantial loss to the system and with the the elimination of sludge in the flow between chambers without passing it through the beds with the chance of redepositing it in the beds.

This application is a continuation of my application Ser. No. 450,115, filed Apr. 22, 1965, and now abandoned.

BACKGROUND OF THE INVENTION

As a general organization, the apparatus of the present invention resembles the dual-chamber, reverse-flow apparatus disclosed in the patent of McGill, No. 1,818,638, granted Aug. 11, 1931, and McGill, No. 2,217,692, granted Oct. 15, 1940.

In the first of these patents the liquid-treating material carried on the porous particulate supporting bed is back-washed by flowing liquid upwardly through the supporting bed and treating material bed of one chamber and down through the treating material bed and supporting bed of the other chamber, the regenerating brine being introduced along the height of the treating material. If violent backwashing is attempted with the equipment of this patent for abrasively cleaning the treating material, as is desired at times, the supporting bed, or at least the upper portion thereof having the smallest particles, is likely to be channelled or otherwise disarranged so that the treating material is lost when the next treating action is started.

In the second patent a backwashing manifold is provided but in only one chamber, the other chamber being backwashed through the supporting bed; but even the manifold in the one chamber is located below the surface of the supporting bed and with the nozzles directed downwardly in such a manner that the finer portion and possibly all of the supporting bed would be disrupted or channelled.

SUMMARY OF THE INVENTION

This invention relates to liquid treating apparatus and method, especially to ion exchange liquid conditioning equipment and method, and has for an object the provision of improvements in this art.

One of the particular objects of the invention is to provide a dual-chamber reverse-flow liquid treating system which furnishes rapid and convenient adaptation for various service conditions, as for example, a softening condition with fluid flow into either chamber, a normal backwashing condition with flow into either chamber, a vigorous abrading backwashing condition with flow into either chamber, or regeneration with fluid flow into either chamber.

Another object is to provide equipment which will give rapid backwashing flow into either chamber while avoiding channelling in the supporting bed which would allow loss of the fine-particle ion exchange material carried upon the supporting bed.

Another object of the invention, in one form, is to provide a divided container which is arranged to furnish the two-compartment reverse-flow arrangement, thus avoiding the cost and space requirements of a two-container system having spaced-apart containers or tanks.

Another object of the invention is to provide an improved system comprising three-way cocks, valves, pipes, and fittings which furnish means by which directional flow, velocity flow, and volume flow may be controlled to a higher degree than has been possible with prior equipment. This is of great value, whether employed with a single container dual-compartment system or with a plural container system.

Another object is to provide means for closely controlling the flow of liquid through the beds of material. If there is insufficient flow there is a gradual build-up of foreign material in the bed which decreases the ion exchange capacity; if there is excessive flow the treating material is subject to abrasion loss. Excessive flow also causes channelling of the treating bed, which allows liquid to flow through with insufficient contact treatment; or causes channelling of the supporting bed, which allows the treating material to wash through and be lost.

One important feature of the invention is the provision of liquid jets located immediately above the supporting beds and immediately below the treating beds and directed upwardly to supply liquid at high velocity and volume to violently agitate and clean the treating beds thoroughly from foreign materials which may collect therein, thus avoiding the loss of treating material through the supporting bed, which is not violently agitated; and avoiding the more difficult and expensive procedure of removing the treating material from the system for cleaning, as has often been necessary heretofore.

BRIEF DESCRIPTION OF THE DRAWINGS

The above and other objects of the invention, as well as various novel features and advantages, will be apparent from the following description of certain exemplary embodiments, reference being made to the accompanying drawings, wherein:

FIG. 1 is a schematic elevational and sectional view of one form in which a single container provides the dual compartments; and FIG. 2 is a schematic view of another form in which two spatially separated containers are used.

DESCRIPTION OF THE PREFERRED EMBODIMENT

The present invention provides backwash fluid supply means immediately above the supporting bed and immediately beneath the treating bed, i.e., between the beds, and with all nozzles directed upwardly whereby the bed of treating material can be violently stirred to abrasively remove adherent sludge without in any way disturbing the supporting bed; moreover, both chambers are provided with high-velocity backwashing means so that both chambers can have the same completely paired reversed operations.

The second McGill patent equipment controls oprations by a main or master valve identified as being disclosed by Riche, Patent No. 2,047,131 supplemented by various separate hand valves.

The apparatus of the present invention includes a main or master valve of the same general type, which has come to be extensively used in water softening plants under the name "Solo" valve, available, as one supply, from Aquamatic, Inc., 2412 Grant Ave., Rockford, Ill., but the present invention has eliminated most of the separate hand valves and instead provides ganged reversing valves, thus greatly minimizing the chance for error in the controlling operations. Such separate hand valves as have been retained have such obvious locations and uses that practically all chance of improper control has been eliminated.

In the form shown in FIG. 1 the apparatus provided by the present invention comprises a single container 10 having a partition 11 extending from the bottom to a point near but below the top to provide two companion treating chambers 12A, 12B with a top passage 12C between them. Each chamber is provided in the bottom with a graduated bed 13 of particulate supporting material with the fines material at the top and the coarsest material at the bottom. Above the supporting bed there is provided a columnar bed 14 of liquid treating material extending up to a point at or near the top of the partition 11 and leaving an open or freeboard space thereabove for expansion of the beds during backwashing.

Each chamber in the bottom is provided with a liquid flow pipe 15A, 15B having a drain outlet 16A, 16B with a valve 17A, 17B and a flow pipe 18A, 18B leading to a three-way reversing valve 19 and having branch pipes 20A, 20B leading to a three-way reversing valve 21.

At the top the container or tank 10 is provided with a pipe 25 having a valve 26, the pipe serving to bleed air from the tank during filling and to draw off sludge at an elevation above that at which treating material can escape during backwashing, even at a more rapid or violent flow which shifts material over the partition from one chamber to the other.

A main, master, or "Solo" valve 27 having a handle 28 controls the type of action which is to occur in the apparatus. It is not necessary to show the details of the "Solo" valve since certain forms are shown in the Riche patent and in the second McGill patent referred to above. The valve has a pipe 29 for supplying raw liquid (hard water, it may be) thereto, a pipe 30 for leading treated liquid (soft water, it may be) therefrom, a pipe 31 leading to drain or waste, a pipe 32 to the reversing valve 19, a pipe 33 leading to the reversing valve 21, and a pipe 34, with a venturi aspirating device (not shown), leading to a regenerating liquid (brine, it may be) tank 35. A valve 36 in the pipe 34 provides for shutting off the regenerating liquid after regeneration has been completed. The means for keeping the tank 35 supplied with regenerating liquid is not shown.

The pipe 29 for raw fluid is provided with a cut-off and throttling valve 37 and a pressure gage 38 and the treated fluid pipe 30 is provided with a sampling cock 39 to determine when the treating material has been exhausted and needs to be regenerated.

Directly above the supporting bed 13 and directly below the bed 14 of treating material in each of the two chambers 12A, 12B there is provided a backwashing manifold 40A, 40B respectively, served by pipes 41A, 41B leading to a three-way reversing valve 42. The valve 42 has a pipe 43 to a main or supply pipe 44 for raw liquid, the pipe 44 also being connected to the pipe 29 of the "Solo" valve. A regulating and cut-off valve 45 and a pressure gage 46 are provided in the pipe 43.

The three reversing three-way valves 19, 21 and 42 are provided with operating handles 19A, 21A and 42A respectively, the handles being gang-connected for simultaneous conjoint operation by a bar 47 pivoted to the handles.

The embodiment shown in FIG. 2 is the same in all essentials as the first embodiment, the difference in detail being that the chambers 12A and 12B are formed in separate containers 10A and 10B instead of in a single container, and that in the illustrated positions of valves 19, 21 and 42 in FIG. 2 the normal flow of raw fluid is upwardly through chamber 12B and downwardly through chamber 12A which is the reverse of the normal flow in FIG. 1. The top connecting passage now becomes a large pipe 12C between two vent pipes 25A, 25B. In other respects the parts correspond to those of the first embodiment.

In operation, with the parts positioned for the normal liquid treating action shown in FIG. 1, a raw liquid, such as hard water, enters by way of pipe 44, pipe 29 (valve 37 being open and adjusted for the desired rate of flow and valve 45 being closed), through "Solo" valve 27 and pipe 32 to valve 19, through pipes 18A and 15A and up through chamber 12A, through top passage 12C, down through chamber 12B, out pipes 15B and 18B to valve 21, through pipe 33 and "Solo" valve 27 to the treated fluid or soft water pipe 30.

By shifting the valves 19 and 21 the flow is reversed, liquid flowing up in chamber 12B and down in chamber 12A. Valve 42 is operated but has no action since the cut-off and throttling valve 45 is closed. No action of the "Solo" valve 27 is required for this reversal.

To backwash at normal rate, the handle 28 of the "Solo" valve 27 is turned to shift the outflow of liquid from the treated fluid pipe 30 to the drain pipe 31. The turning of valves 19 and 21 will reverse the flow through chambers 12A and 12B, as before.

To backwash at a higher rate, the high volume valve 45 is opened for the desired rate of flow to supply fluid to one of the chambers 12A or 12B at the manifold 40A or 40B above the supporting bed and below the treating bed, the flow from the ports or nozzles being upward so as not to disturb or channel the supporting bed. Valve 37 which controls normal flow through the beds may be left open to add to the total volume of liquid flowing through the chambers or may be closed while valve 45 is open. Even if valve 37 is left open there will not be enough upflowing liquid through the supporting bed which it enters to channel or disturb the bed.

However, the upflow from the manifold 40A or 40B will be sufficiently great, and all upward, to violently agitate the bed of treating material in the upflow chamber to abrade the adherent material off the particles as sludge. This can pass out through the bed material by downflow in the other chamber without disturbing the treating and supporting beds since all the flow there is downward. The action is improved and the sludge more completely removed by reversing the ganged valves 19, 21, 42 as often as desired to reverse the flow in the treating chambers 12A, 12B.

The treating material may be washed through the passage 12C from one chamber to the other but that will not change the action of the apparatus since the total column length of treating material through which the liquid passes will not be changed no matter which chamber carries the longer column.

If there is any tendency for the sludge to remain in the system by lodging in the downflow bed, its removal may be aided by opening the valve 26 in the top pipe 25 to allow some of the fluid to escape there, carrying the fine and light sludge along with it. The flow will be adjusted so that there is never any loss of the treating material, that being coarser and heavier than the sludge.

After all desired backwashing has been completed the system is restored to its condition for normal procedure— treating, normal backwashing, regeneration, rinsing, or the like.

The regenerating action is not particularly related to the present invention but the line 34 and tank 35 have been shown because they are usual equipment associated with the "Solo" valve and contribute a usual part of the total treatment cycle. The "Solo" valve has a handle position and appropriate passages and injection elements to cause regenerating liquid to be drawn from the tank 35 by continued inflow of raw liquid, the outflow from the "Solo" valve being to drain during regeneration. The rinse backwash to remove the regenerating residue from the system also flows to the drain.

In the operation of the apparatus shown in FIG. 2, raw liquid, such as hard water, enters by way of pipe 44, pipe 29 (valve 37 being open and adjusted for desired rate of normal maximum flow and valve 45 being closed), through "Solo" valve 27, through pipe 32, through valve 19, through pipes 18B and 15B, up through chamber 12B, through pipes 25B, 12C and 25A, down through chamber 12A, through pipes 15A, 18A, 20A, valve 21 pipe 33 and "Solo" valve 27 to pipe 30.

By shifting the valves 19 and 21, the flow of treated liquid is reversed, liquid now flowing up chamber 12A and down 12B. Valve 42 is operated but has no action since the cut-off and throttling valve 45 is closed. No action of the "Solo" valve is required for the reversals of the normal treated water flow.

To backwash at normal rate, the handle 28 of the "Solo" valve 27 is turned to the backwash position which shifts the outflow of liquid from the treated fluid pipe 30 to the drain pipe 31. In backwash flow the raw fluid enters by way of pipe 44, through an open valve 37, pipe 29, through "Solo" valve 27, down pipe 33, through valve 21, through pipes 20A, 18A, 15A, up through chamber 12A, through pipes 25A, 12C, 25B, down through chamber 12B, through pipes 15B, 18B, through valve 19, pipe 32, "Solo" valve 27, and out drain 31.

To backwash at a higher rate, the high volume valve 43 is opened, permitting rapid water flow through pipe 43, valve 42, out vertically from jet manifold 40A, up through chamber 12A joining the flow of backwash water described above. By shifting valves 19 and 21, the flow of backwash liquid may be reversed at will as described previously.

It will be seen that the provision of backwash manifolds in both chambers and their location immediately above the supporting bed and immediately below the treating beds and with jet nozzles opening only upward, provide a most convenient and efficient means for violently agitating the treating beds without in any way disturbing the supporting beds. With prior apparatus having a washout manifold located in only one chamber and not completely about the supporting bed and with nozzles directed downwardly, the action could not be reversed and there was likely to be channelling and disruption of the supporting bed with subsequent loss of treating material. This material is quite expensive and any loss is most undesirable.

The provision of the ganged reversing valves and their appurtenances provides ready control distinct from but coordinated with the action of the "Solo" valve without requiring any alteration of the construction, appurtenances, or action of the "Solo" valve. Such separate and independent valves, other than the ganged reversing valves and the "Solo" valve, have obvious locations and functions and it is practically impossible for even the most unskilled operator to do anything to the system which would cause improper operation or damage.

While certain embodiments of the invention have been described for purposes of illustration, it will be understood that there may be various embodiments and modifications within the general scope of the invention.

I claim:

1. A liquid conditioning system, comprising in combination, container means providing a companion pair of treatment chambers, each treatment chamber having there in a granular supporting bed at the bottom and a columnar liquid treatment had of fine granular material thereabove leaving an open or freeboard space above the top thereof, means forming a communicating passage between the open top spaces of said chambers providing for the movement therebetween of liquid and treatment material, cycle valve and piping means providing for the flow of raw liquid into the bottom of either chamber and the outflow of treated liquid from the bottom of either chamber to use or waste pipes selectively, and reversing valve and piping means for selectively reversing the flow of liquid through said chambers independently of the condition of said cycle valve and piping means, said reversing valve and piping means, said reversing valve and piping means including a plurality of three-way valves and a gang connection for actuating all of said three-way reversing valves together.

2. A liquid conditioning system as set forth in claim 1, further characterized by the fact that said cycle and piping means includes a single master control valve having a raw liquid pipe, a treated liquid pipe, a waste liquid pipe, and two treatment chamber pipes, and that two of said three-way reversing valves are respectively connected to said two treatment chamber pipes on a common side port and selectively to separate pipes leading to the two treatment chambers by ports on other sides.

3. A liquid treatment system as set forth in claim 1, further characterized by the fact that said two treatment chambers are formed in a single container with a partition extending upward from the bottom to a point near but below the top, leaving said communicating passage as an open space at the top.

4. A liquid conditioning system, comprising in combination, container means providing a companion pair of treatment chambers, each treatment chamber having therein a granular supporting bed at the bottom and a columnar liquid treatment bed of fine granular material thereabove, leaving an open or freeboard space above the top thereof, means forming a communicating passage between the open top spaces of said chambers providing for the movement therebetween of liquid and treatment material, a liquid supply manifold in each chamber at the dividing line between said supporting bed and said treatment bed, said manifolds having liquid discharge means directed upwardly only, cycle control means including valve and piping elements providing for the flow of raw liquid into the bottom of either chamber to use or waste pipes selectively, and means including reversing valve and piping elements for selectively and simultaneously reversing the flow of liquid through said chambers and of raw liquid to said manifolds independently of the condition of said cycle means, said reverse flow of raw liquid from said manifolds flowing simultaneously in a common direction to supplement each other to backwash the fine granular material in the chambers.

5. A liquid conditioning system as set forth in claim 4 further characterized by the fact that said reversing means includes a plurality of gang-actuated three-way reversing valves.

6. A liquid conditioning system as set forth in claim 5, further characterized by the fact that said cycle means includes a single master valve having a raw liquid pipe, a treated liquid pipe, a waste liquid pipe, and two treatment chamber pipes, that two of said reversing valves are three-way valves each connected in common at one side port to one of said treatment chamber pipes of the master valve and at the other side ports to separate pipes leading to said two chambers selectively, and that a third one of said reversing valves is connected by a side port to a raw liquid supply and at other side ports to separate pipes leading to the manifolds of the two treatment chambers respectively, and a cut-off and throttling valve for each said raw liquid pipe of said master valve and the raw liquid supply pipe for said third reversing valve.

7. A liquid conditioning system as set forth in claim 4, further characterized by the fact that a valve controlled vent and liquid outflow pipe is provided for said chambers above said communicating passage for removing sludge with a portion of the liquid flowing through the system during sludge-removing backwashing operation.

8. In a liquid conditioning system having companion treatment chambers with a supporting bed and a treatment bed thereabove in each chamber and with means to perform treating, backwashing, regenerating, rinsing backwashing, and high volume backwashing operations in said chambers in reversible series flow of liquid in said chamber, the method of backwashing which comprises, directing high-volume jets of liquid upward through the treating beds selectively from the bottom thereof immediately above the supporting bed in either chamber, whereby to violently lift the material of the treating bed of one chamber without channelling or disturbing the supporting bed in the chamber and providing a low-volume backwashing action while the high-volume backwashing is being performed.

9. The method as set forth in claim 8, which further comprises transferring at least a portion of the treatment material between the chambers through a transfer zone during backwashing and drawing off part of the liquid with sludge at the top of at least one of the chambers above the transfer zone of treatment material between chambers.

References Cited

UNITED STATES PATENTS

| | | | |
|---|---|---|---|
| 478,261 | 7/1892 | Jewell et al. | 210—279 X |
| 1,233,016 | 7/1917 | Bartlett | 210—190 |
| 1,818,638 | 8/1931 | McGill | 210—190 X |
| 1,873,305 | 8/1932 | De Ville | 210—190 |
| 1,903,958 | 4/1933 | Clark | 210—189 |
| 1,958,893 | 2/1934 | Walker | 210—279 |
| 2,217,692 | 10/1940 | McGill | 210—190 X |

SAMIH N. ZAHARNA, *Primary Examiner.*

J. ADEE, *Assistant Examiner.*

U.S. Cl. X.R.

210—82, 189, 278, 279

PO-1050
(5/69)

UNITED STATES PATENT OFFICE
CERTIFICATE OF CORRECTION

Patent No. 3,441,503　　　　　　　　Dated　April 29, 1969

Inventor(s)　Frank J. Smith

It is certified that error appears in the above-identified patent and that said Letters Patent are hereby corrected as shown below:

Column 5, line 70, the word "had" should be --bed--.

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents